United States Patent [19]

Endo et al.

[11] Patent Number: 4,469,802

[45] Date of Patent: Sep. 4, 1984

[54] PROCESS FOR PRODUCING SINTERED BODY OF BORON NITRIDE

[75] Inventors: Tadashi Endo; Osamu Fukunaga; Tadao Sato, all of Ibaraki, Japan

[73] Assignee: National Institute for Researches in Inorganic Materials, Ibaraki, Japan

[21] Appl. No.: 450,734

[22] Filed: Dec. 17, 1982

[30] Foreign Application Priority Data

Apr. 7, 1982 [JP] Japan ................................. 57-57549

[51] Int. Cl.³ ............................................. C04B 35/58
[52] U.S. Cl. ...................................... 501/96; 264/65; 423/290
[58] Field of Search ........................... 501/96; 264/65; 403/290

[56] References Cited

U.S. PATENT DOCUMENTS 3,811,899  5/1974  Stibbs et al. ......................... 501/96
4,188,194  2/1980  Corrigan .............................. 264/65

FOREIGN PATENT DOCUMENTS 0040124  10/1974  Japan .................................... 501/96

OTHER PUBLICATIONS

Endo et al., "The Synthesis of cBN using $Ca_3B_2N_4$", J. of Material Science 16, (1981) 2227–2232.
The Journal of Chemical Physics, vol. 38, No. 5, F. P. Bundy et al., "Direct Transformation of Hexagonal Boron Nitride to Denser Forms", March 1963.
The Journal of Chemical Physics, vol. 63, No. 9, F. R. Corrigan et al., "Direct Transitions Among the Allotropic Forms of Boron Nitride at High Pressures and Temperatures", Nov. 1975.
Mat. Res. Bull., vol. 7, pp. 999–1004, 1972, M. Wakatsuki et al., "Synthesis of Polycrystalline Cubic BN".

Primary Examiner—Howard S. Williams
Assistant Examiner—Terryence Chipman
Attorney, Agent, or Firm—Oblon, Fisher, Spivak, McClelland & Maier

[57] ABSTRACT

A process for producing a sintered body of cubic system boron nitride comprises steps of:
(a) mixing raw material boron nitride selected from the group consisting of hexagonal system boron nitride, cubic system boron nitride, and a mixture thereof with $Me_3B_2N_4$ (where: Me represents an alkaline earth metal) in an amount of from 0.15 to 3.0 mol %; and
(b) treating said mixed material at a temperature of 1350° C. and above under a thermodynamically stabilized pressure condition of the cubic system boron nitride.

4 Claims, 4 Drawing Figures

FIGURE 1
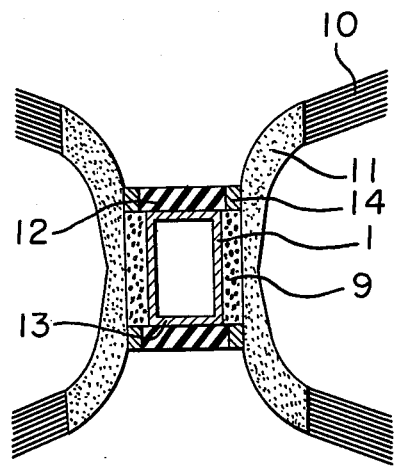
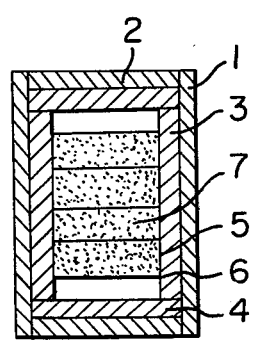
FIGURE 2A
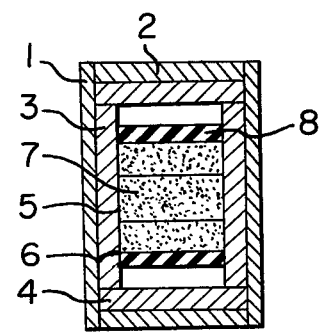
FIGURE 2B

10 μm

Temperature (°C)

PROCESS FOR PRODUCING SINTERED BODY OF BORON NITRIDE

This invention relates to a process for producing a sintered body of cubic system boron nitride, and, more particularly, it is concerned with a process which is capable of readily producing a sintered body of cubic system boron nitride having high density, high purity and light-transmitting property.

The cubic system boron nitride which crystallizes in a sphalerite form possesses hardness comparable with diamond, and, in addition, it has thermal as well as chemical stability far superior to that of diamond. Further, this type of boron nitride possesses an excellent property such that it enables grindling and abrading of high speed steel, alloy steel with nickel and cobalt as the basic composition thereof, cast iron, and so forth, the working of which cannot properly be done with diamond.

With advent of various sorts of material for industrial use in recent years, improvement and development of the working techniques on these materials are desired, among which the cubic system boron nitride has drawn attention of all concerned as the material for a high speed and high precision working tool.

However, powder-sintering of the cubic system boron nitride has a technically difficult point, so that various kinds of binding material are added, in practice, to cubic system boron nitride powder to produce its sintered body. In the process for producing the cubic system boron nitride as disclosed in, for example, U.S. Pat. No. 3,233,988, Japanese Patent Publication No. 8948/1964, Japanese Patent Publication No. 17838/1977 and Japanese Patent Publication No. 40300/1979, a number of substances containing therein carbide, oxide, nitride and boride are regarded as effective as the binding materials. However, these binding materials take part in the sintering reaction among the crystallized particles of the cubic system boron nitride as an unknown or already known constituent element.

Accordingly, the micro-structure of such sintered body is not homogeneous, and, even when the constituent element is in a highly dispersed condition, the intergranular bonding of the cubic system boron nitride cannot always be said to be rigid. Moreover, the thermal expansion strain due to effect of the addition of such binding material or the chemical interaction among the particles of the cubic system boron nitride, or other factors cause the mechanical property, in particular, the thermal stability, of the sintered body thereof to be remarkably lowered.

On the other hand, use of the cubic system boron nitride is not limited to those mentioned in the foregoing. For instance, its heat-conductivity is remarkably high in comparison with that of the conventional ceramics, and is comparable substantially with that of diamond. In consequence of this, the material is expected not only to be used as a heat sink material, etc., but also to be applied to electronic material making much use of its characteristics such as piezo-electricity, high refractive index, semi-conductive property, and so forth.

From such viewpoint, the sintering reaction of the cubic system boron nitride is required to be done without presence of the additive as mentioned above, hence there has been desired a process for producing the cubic system boron nitride sintered body having high purity and high density.

As the process for realizing such ideal, there have so far been proposed the following ones.

(1) A process, wherein hexagonal system boron nitride having a structure similar to that of graphite is exposed to high pressure and high temperature conditions of 10 GPa and 2,000° C., thereby directly converting it into the cubic system boron nitride (vide: Japanese unexamined patent publication No. 13731/1966).

In attaining the abovementioned synthetic conditions for this process, those devices for applying pressure and heat should take an extremely particular construction, and, in addition, the volume of the specimen becomes extremely small. Accordingly, its production is limited disadvantageously.

(2) A process, wherein low-temperature and high-pressure phase wurtzite boron nitride, as the starting raw material, is converted to the cubic system boron nitride without addition of any additive substance thereto. (vide: Japanese unexamined patent publication No. 128700/1976).

The set pressure and temperature in this process raises no problem in respect of the mechanical strength of a high pressure generating device. However, in its practical aspect, there are several points of problem as to the reproducibility of the resulting cubic system boron nitride sintered body.

The reason for this is that there is, in general, high possibility of the wurtzite boron nitride remaining in the sintered body of the cubic system boron nitride, and that the wurtzite boron nitride is usually synthesized by a dynamic pressure applying method (an explosive shock compression method), on account of which the particles to be produced is very fine (1 micron or below) and the chemical properties thereof are not clear in many respects. Therefore, consideration should be given unavoidably to an influence of the impurities in the course of sintering the cubic system boron nitride.

(3) A process, wherein hexagonal boron nitride having a peculiar property is directly converted into the cubic system boron nitride to thereby produce the sintered body having high density. (vide: Japanese unexamined patent publication No. 17520/1977 and Japanese unexamined patent publication No. 167110/1980).

These three processes are significant in respect of their indicating that the temperature and pressure for the phase-transformation become lower depending on the particle size, the degree of crystallization, structural regularity, and so on of the hexagonal system boron nitride as the starting raw material, although there still remains a problem such that impurities adsorbed on the surface of particles of the hexagonal system boron nitride activated by a pre-treatment step and the hexagonal boron nitride consisting of very fine primary particles (0.5 μm or below) have influence on the property of boron nitride.

It is therefore an object of the present invention to provide an improved process for producing the sintered body of cubic system boron nitride having high density, high purity and light-transmitting property, which is free from all the shortcomings inherent in the conventional processes.

According to the present invention, in general aspect of it, there is provided a process for producing a sintered body of cubic system boron nitride which comprises steps of mixing hexagonal system boron nitride or cubic system boron nitride or a mixture thereof with $Me_3B_2N_4$ (where: Me represents an alkaline earth metal) in an amount of from 0.15 to 3.0 mol %, and then treating said material at a temperature of 1350° C. and above under a thermodynamically stabilized pressure condition of the cubic system boron nitride.

The foregoing object, other objects as well as specific conditions and materials for use in the present process will become more apparent and understandable from the following detailed description thereof, when read in connection with several preferred examples thereof in reference to the accompanying drawing.

In the accompanying drawing

FIG. 1 is a longitudinal cross-section showing a belt-type high pressure device;

FIGS. 2A and 2B are respectively longitudinal cross-sections showing the structures of specimens;

Figure 3:
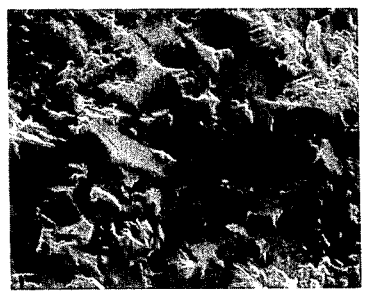
Figure 4:
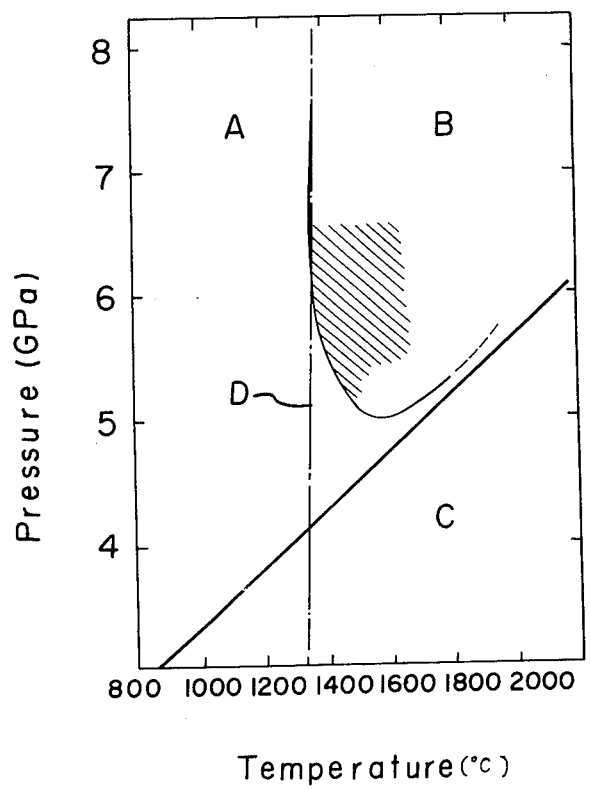

FIG. 3 an SEM image of a fractured surface of a high density sintered body of cubic system boron nitride; and FIG. 4 is a diagram showing temperature versus pressure conditions in the synthesizable region for the cubic system boron nitride according to the present invention.

In the following, the present invention will be described in specific details with reference to the specific reaction conditions and materials for use in the production of the cubic system boron nitride.

It has so far been known that the elements of Ia, IIa and IIIa groups in the Periodic Table, and nitrides or alloys of these elements have the catalytic function at the production of the cubic system boron nitride crystals. These elements and their nitrides or alloys, however, by-produce unstable boride and isolated boron in the chemical reaction system thereof, or remain in the reaction system as the unreacted nitride. As the result of this, the quality, purity, and so forth of the crystals of the cubic system boron nitride as produced are remarkably lowered, causing disadvantage in the process.

The present inventors have previously clarified the reaction mechanism between the catalytic substance and boron nitride, and have established a process of producing crystals of the cubic system boron nitride having high quality and high purity by use of $Me_3B_2N_4$ (where: Me denotes an alkaline earth metal). In more detail, $Me_3B_2N_4$ assumes a liquid phase in the temperature-pressure region where cubic system boron nitride crystals are synthesized, and wherein formation of the nucleous of cubic system boron nitride and its crystal growth are realized through the melting step of hexagonal system boron nitride based on the eutectic relationship. In particular, the present inventors have discovered that, when $Me_3B_2N_4$ is used in an amount of 45% by weight and above, there can be obtained the cubic system boron nitride, in which the particles are relatively coarse and each of them is highly crystallized. As the result of further researches and experiments, they have also found out that, when a very small amount (e.g., 0.15 to 3.0 mol %) of $Me_3B_2N_4$ (where Me represents an alkaline earth metal such as magnesium, calcium, bromine, barium, etc.) is added to the hexagonal system boron nitride or the cubic system boron nitride or a mixture powder thereof, and the mixed material is subjected to treatment at a temperature of 1350° C. (corresponding to the eutectic temperature of $Me_3B_2N_4$ and hexagonal system boron nitride) and above under a thermodynamically stabilized pressure condition of the cubic system boron nitride, there can be obtained a high density sintered body of the cubic system boron nitride having a very fine particle diameter and an appropriate particle distribution. More surprisingly, they have also discovered that the resulted sintered body has a high purity and a light-transmitting property. Based on these findings, they have completed the present invention.

This light-transmitting property of the cubic system boron nitride according to the present invention is considered due to the fact that $Me_3B_2N_4$ has a low viscosity coefficient at a high temperature level. That is to say, the diffusion speed of $Me_3B_2N_4$ at the grain boundary of the hexagonal system boron nitride is extremely high, whereby its conversion into the cubic system boron nitride is realized, and, at the same time, the substance is turned into a high density light-transmitting sintered body having a perfectly homogeneous structure due to movement of the substance at the particle boundary of the cubic system boron nitride caused by participation of the liquid phase of the substance. That is to say, it is considered that, in this reaction system, since no different phase such as boride, nitride, etc. is deposited at the particle boundary of the cubic system boron nitride, the diffusing step of $Me_3B_2N_4$ does not take a regulated speed, and the sintering and shrinkage proceed together, while promoting plastic flow of the cubic system boron nitride particles.

According to the present invention, when the very fine powder of cubic boron nitride (approximately 3 to 8 μm or so) is used as the starting raw material, rearrangement and particle growth of the cubic system boron nitride are accelerated by the presence of $Me_3B_2N_4$ in the liquid phase, as the result of which a high density sintered body can be obtained. It is further preferable to include a treatment step wherein the surface of the cubic system boron nitride is partly subjected to reverse transformation into the hexagonal system boron nitride, or to use both cubic system boron nitride and hexagonal system boron nitride in mixture.

In the present invention, when $Mg_3B_2N_4$ is used as $Me_3B_2N_4$, the nucleous forming speed of the cubic system boron nitride and the particle growing speed thereof tend to be governed by the temperature and pressure conditions more than those in the case of using boron nitride of other alkaline earth metals. Accordingly, the process is preferable in respect of its possibility of ingeniously controlling the competing relationship between $Me_3B_2N_4$ and the raw material boron nitride in the process of transforming from the hexagonal system boron nitride to the cubic system boron nitride. However, it goes without saying that the alkaline earth metal other than magnesium can also be used in the same way as magnesium.

$Me_3B_2N_4$ to be used in the present invention can be prepared by mixing $Me_3N_2$ or Me with the hexagonal system boron nitride at a mol ratio between Me and boron nitride of 3:2, and then heating the mixture in a nitrogen gas atmosphere at approximately 1100° C. for two hours or longer. While many of the well known catalysts are not stable to humidity, $Mg_3B_2N_4$, in particular, is a stable compound in the air, hence its handling is advantageously easy.

The hexagonal system boron nitride as the starting raw material should preferably be of high purity, have a particle size of from 1 to 6 microns or so, and contain oxygen of 2% by weight or below. It is therefore preferable that powder of hexagonal system boron nitride available in the general market is heat-treated, for example, in a nitrogen gas atmosphere under a normal pressure and at about 2000° C. for several hours, thereby reducing the oxygen content therein to less than 2.0% by weight.

The cubic system boron nitride as the starting material should preferably be of high purity and good quality. For instance, when black and non-transparent cubic system boron nitride is used, the resulting sintered body thereof is also in black color and has high density.

The mixing ratio of $Me_3B_2N_4$ into the cubic system boron nitride or the hexagonal system boron nitride or a mixture of these boron nitrides is required to be in a range of from 0.15 to 3.0 mol %. If the mixing ratio does not reach 0.15 mol %, no satisfactory effect can be exhibited from the product. When the mixing ratio exceeds 3.0 mol %, no favorable sintered body can be obtained due to excessive quantity of $Me_3B_2N_4$ remaining in the particle boundary of the sintered body or abnormal particle growth occurring locally. In order to obtain the sintered body having a favorable light-transmitting property, the mixing ratio should preferably range from 0.15 to 1.8 mol %.

The sintering condition is required to be 1350° C. and above under the thermodynamically stabilized pressure condition of the cubic system boron nitride. This pressure value is evaluated with the phase transfer to be induced by bismuth, tallium and barium under the normal pressure as the fixed point of pressure, which is based on the "load versus pressure curve" drawn with the respective fixed point of pressure of the elements being 2.55, 3.7, and 5.5 GPa. Further, the temperature is measured by use of a thermocouple made of platinum platinum/rhodium (13%), wherein the electric power to be applied to a graphite heater is controlled.

FIG. 4 shows a temperature versus pressure conditions in a region where the cubic system boron nitride can be synthesized. In the drawing, A and B denote the thermodynamically stabilized regions, B denotes a region where the crystals of the cubic system boron nitride are synthesized (when $Me_3B_2N_4$ is used), C represents the thermodynamically stabilized region of the hexagonal system boron nitride, and D designates an eutectic line of $Me_3B_2N_4$ and boron nitride. The present invention carries out the synthesis of the cubic system boron nitride in the region B.

According to the process of the present invention, a belt-type high pressure device as shown in FIG. 1 is used. In FIG. 1, a longitudinal cross-section of a specimen structure in the belt-type high pressure device is shown. In the drawing, a reference numeral 9 designates cylinder of table salt as a pressure applying medium, which is in a molten or semi-molten state under a producing temperature versus pressure condition for the cubic system boron nitride sintered body, a numeral 1 refers to a graphite heater, a numeral 10 denotes a paper gasket, 11 indicates a pyrophyllite gasket, 12 is $ZrO_2$, 13 denotes a molybdenum plate, and 14 designates a current ring.

Alternating current or direct current power is supplied to the graphite heater 1 from the top and bottom anvils through the current rings 14 and the molybdenum plates 13. Such high pressure and high temperature generating device may be of any type which is capable of maintaining the operating conditions throughout a time period required for producing the sintered body of cubic system boron nitride.

With a view to enabling those skilled in the art to put the present invention into practice, there will be presented several preferred examples thereof.

EXAMPLE 1

FIG. 2A illustrates a longitudinal cross-section of a specimen construction as used in this Example. In the drawing, a reference numeral 1 designates a graphite heater, a numeral 2 refers to a graphite disc, 3 and 4 denote respectively a cylinder and a disc of table salt, and 5 and 6 designate a reaction vessel constructed with a cylinder and a disc of molybdenum.

$Mg_3B_2N_4$ synthesized under a normal pressure and powder of hexagonal system boron nitride (particle size of from 1 to 6 $\mu$m) were sufficiently mixed at a mol ratio of 0.7:99.3. This mixing operation should preferably be done in either dry air or a nitrogen atmosphere. This mixture was shaped in a tablet mold under a pressure of approximately from 2 to 4.5 tons/cm$^2$ and then charged in the molybdenum cylinder 5. The charge placed in the sintering device was maintained for approximately 30 minutes under pressure and temperature conditions of 5.7 GPa and 1600° C., and the reaction product was taken out of the sintering device after quenching the same. The molybdenum cylinder was removed by immersing it in aqua regis and subjecting the same to boiling treatment. The obtained product was in light green, and, upon observing through a microscope, it was verified to be a high density sintered body consisting of a homogeneous micro-structure. The product possessed a high light-transmitting property with respect to visible light. Through the powder X-ray diffraction, it was identified as a single phase of the cubic system boron nitride. According to the elementary analysis by EPMA, no magnesium was detected on the surface of the sintered body and its fracture plane.

The specific gravity of the reaction product was 3.48 which was conincident with the theoretical density of the cubic system boron nitride. Also, its hardness was in a range of from 7,600 to 5,400 kg/mm$^2$ (according to micro-indentation hardness), which was found to be an extremely tough high density body.

The obtainment of such light-transmitting sintered body having high refractive index (2.12) indicates that no absorption band is generated due to impurity or lattice defect which is the cause for lowering the transmission factor of light, and also no absorption and scattering of light are brought about due to pores, particles of foreign substances, grain boundary phase, or particles of a diameter smaller than the light wavelength, and so forth present in the sintered body.

For the sake of comparison, the hexagonal system boron nitride alone was used as the starting raw material, which was treated under the exactly same reaction conditions as mentioned above. The result was that the product as taken out remained to be the hexagonal system boron nitride, which had not been sintered at all.

EXAMPLE 2

Cubic system boron nitride of good quality and high purity (in light yellow and having particle diameter of from 4 to 8 $\mu$m) was sufficiently mixed with $Mg_3B_2N_4$ at a mol ratio of 97.5:2.5, after which the mixture was charged in the molybdenum reaction vessel as shown in FIG. 2A. For maintaining the mixture in a disc shape, a load of approximately 4.0 tons/cm$^2$ was applied on it. In this case, it is desirable to carry out the pressure shaping operation under a reduced pressure of approximately 10$^{-3}$ Torr or so. After the shaped product was treated for 30 minutes under the pressure and temperature conditions of 5.5 GPa and 1550° C., there was obtained the sintered body in the same manner as in Example 1 above. The sintered body was in ash-white and semi-transparent, and consisted of a single phase of cubic system boron nitride. The specific gravity of the product was 3.48, and its hardness showed 5,700 kg/mm$^2$ at the maximum value.

EXAMPLE 3

Black and non-transparent fine powder of cubic system boron nitride (particle size of from 1 to 5 μm) available in the general market was mixed with $Mg_3B_2N_4$, with which the sintered body was produced in the same manner as in Example 2 above. The thus obtained sintered body was black and non-transparent, but consisted of a single phase of the cubic system boron nitride. The specific gravity of the reaction product was 3.48 and the hardness thereof ranged from 4,400 to 5,200 kg/mm$^2$. The black and non-transparent cubic system boron nitride contained therein boron as an impurity, which is considered to have deposited at the grain boundary of the sintered body. A slightly brown transparent portion was observed at the fractured plane of the product.

EXAMPLE 4

Powder of hexagonal system boron nitride (particle diameter of from 4 to 6 μm) was mixed with powder of cubic system boron nitride (particle diameter of from 4 to 8 μm) in a quantity of approximately 40% by weight of the former with respect to the latter, after which $Mg_3B_2N_4$ was added to the boron nitride mixture powder at a mol ratio of boron nitride to $Mg_3B_2N_4$ of 98.3:1.7, and mixing operation was conducted for one full day and night. The mixture was then shaped under a load of approximately 3.5 tons/cm$^2$ applied thereon, followed by charging the same in a molybdenum reaction vessel wherein it was reacted for about 40 minutes under the pressure and temperature conditions of 5.8 GPa and 1450° C., and quenched. The molybdenum reaction vessel was removed by treatment in acid, thereby obtaining the reaction product. The product was a high density transparent sintered body in light yellowish green. Through the X-ray diffraction method, it was verified to be a single phase of the cubic system boron nitride. The specific gravity and hardness of the product was as equal as those in Example 1 above.

An SEM image of this sintered body at its fractured plane is as shown in FIG. 3. As this photographic representation indicates, it is seen that the micro-structure of the product is substantially uniform, the particles had grown appropriate to such an extent that no individual particle diameter could be evaluated, and the particle boundary is in a very rigid bonding. It is also seen from the condition of the fractured plane that the destruction occurred at the cleavage plane in the interior of the particles.

EXAMPLE 5

Powder of cubic system boron nitride (20 to 40 microns in particle diameter) of good quality and high purity was heat-treated for 30 to 50 minutes at about 1500° C. in a nitrogen atmosphere (at a flow-rate of from 2 to 3 liters/minute) to thereby reversely transform a part of the cubic system boron nitride into the hexagonal system boron nitride. The rate of conversion was 87%. To this boron nitride powder, $Mg_3B_2N_4$ was mixed at a mol ratio of 99.0:1.0, after which the mixture was heat-treated for 35 minutes under the pressure and temperature conditions of 6.0 GPa and 1500° C. Thereafter, it was quenched and taken outside. The thus obtained reaction product was a high density, transparent body of the cubic system boron nitride in light green. Through the microscopic observation, it was found to have been much more homogeneous in the micro-structure than that in Example 4 above. The specific gravity of the product was 3.48, and the hardness thereof was 6,000 kg/mm$^2$.

EXAMPLE 6

Particles of cubic system boron nitride (having a particle diameter of from 4 to 8 μm) of good quality and high purity was sufficiently mixed with $Mg_3B_2N_4$ at a mol ratio of 99.5:0.5, and then subjected to a pressure-shaping by applying a load thereon of approximately 4 tons/cm$^2$, after which the shaped product was charged in the molybdenum reaction vessel, and subjected to heat-treatment for 20 minutes under the pressure and temperature conditions of 3.6 GPa and approximately 1520° C. After this, the pressure was further raised to 6.0 GPa at the same value of the electric power and the heating was continued for 20 minutes, followed by quenching the same. The reaction product as obtained was found to be the sintered body of cubic system boron nitride having the light-transmitting property same as that obtained in Example 5 above. The pressure and temperature conditions of 3.6 GPa and 1520° C. respectively are the thermodynamically stabilized conditions for the hexagonal system boron nitride, whereby a part of the cubic system boron nitride transforms reversely into the hexagonal system boron nitride.

COMPARATIVE EXAMPLE 1

Hexagonal system boron nitride and $Mg_3B_2N_4$ were sufficiently mixed at a mol ratio of 96:4, and the mixture was shaped and charged into a molybdenum reaction vessel of a specimen structure as shown in FIG. 2B. In this specimen structure, the sintered body of hexagonal system boron nitride was disposed at a low temperature section 8. This hexagonal system boron nitride sintered body was heat-treated at approximately 2100° C. in a nitrogen gas atmosphere to reduce the content of oxygen as an impurity to 0.6% by weight and below. The specimen of this construction was subjected to a high-pressure, high-temperature treatment for 30 minutes under 6 GPa and at 1550° C., followed by quenching the same. The specimen thus treated and taken out after removal of the pressure consisted of a high density, light green transparent body of cubic system boron nitride and an unreacted hexagonal system boron nitride sintered body, a layer of a yellow aggregate having been observed at the boundary between these bodies. This layer was identified as being composed of cubic system boron nitride and $Mg_3B_2N_4$ as the result of the powder X-ray diffraction. The SEM observation revealed a single crystal growth of cubic system boron nitride having a particle size of from 20 to 60 microns at the side of hexagonal system boron nitride. From this, it was found out that the production stages of cubic system boron nitride sintered body was different from the crystal growing stages of the cubic system boron nitride. That is to say, the mixing quantity of $Mg_3B_2N_4$ is required to be 3.0 mol % or below, from which a light-transmitting sintered body of the cubic system boron nitride having an appropriate particle size and a size distribution was found to be obtainable.

EXAMPLE 7

Powder of cubic system boron nitride (36 to 22 microns) with good quality and high purity was exposed for approximately 30 minutes at 1520° C. in a nitrogen gas atmosphere of 1 atmospheric pressure, thereby transforming one part thereof to hexagonal system boron nitride. The rate of conversion was 65%. The thus treated boron nitride was sufficiently mixed with $Ca_3B_2N_4$ at a mol ratio of 98.5:1.5. The mixing operation was done in dry air or in a nitrogen gas atmosphere so as not to cause $Ca_3B_2N_4$ to be hydrolyzed. Then, the obtained mixture was shaped into a disc by applying a pressure of approximately 3.5 tons/cm$^2$, and the thus shaped material was placed in the molybdenum reaction vessel to subject the same to a high-temperature, high-pressure treatment for approximately 40 minutes under 6.0 GPa and at 1450° C. After quenching the treated material, it was taken out of the reaction vessel.

The resulted reaction product was a yellow transparent sintered body consisting of a single phase of the cubic system boron nitride. The specific gravity of this sintered body was 3.48 and its hardness was in a range of from 5,000 to 5,600 kg/mm$^2$, these values indicating that the sintered body was of high density.

EXAMPLE 8

In place of $Ca_3B_2N_4$ in Example 7 above, $Sr_3B_2N_4$ was used to prepare a mixture of boron nitride. Such mixture was then treated for approximately 35 minutes under the high pressure and high temperature conditions of 6.2 GPa and 1400° C., respectively. The other steps were same as those in Example 7 above. The resulted reaction product was a high density sintered body of the cubic system boron nitride in light yellow having high transparency. The specific gravity and the hardness of this product were almost same as in Example 7.

In the foregoing, the present invention has been described in details with reference to several preferred examples thereof. It should, however, be understood that these examples are only illustrative of how the present invention is put into practice, and that they do not intend to limit the scope of the invention as set forth in the appended claims. Rather, any changes and modifications may be made within the spirit and scope of the invention as claimed.

We claim:

1. A process for producing a sintered body of cubic system boron nitride which comprises steps of:
    (a) mixing raw material boron nitride selected from the group consisting of hexagonal system boron nitride, cubic system boron nitride, and a mixture thereof with $Me_3B_2N_4$ (where: Me represents an alkaline earth metal) in an amount of from 0.15 to 3.0 mol %; and
    (b) treating said mixed material at a temperature of 1350° C. and above under a thermodynamically stabilized pressure condition of the cubic system boron nitride.

2. The process according to claim 1, further comprising of treating the surface of the cubic system boron nitride to reversely transform the same into hexagonal system boron nitride at least in one part thereof.

3. The process according to claim 1, wherein said mixing ratio of $Me_3B_2N_4$ and boron nitride ranges from 0.15 to 1.8 mol %.

4. The process according to claim 1, wherein said $Me_3B_2N_4$ is one selected from the group consisting of $Mg_3B_2N_4$, $Ca_3B_2N_4$, and $Sr_3B_2N_4$.

* * * * *